(12) United States Patent
Solberg

(10) Patent No.: US 10,800,086 B2
(45) Date of Patent: Oct. 13, 2020

(54) CO-EXTRUSION OF PERIODICALLY MODULATED STRUCTURES

(71) Applicant: PALO ALTO RESEARCH CENTER INCORPORATED, Palo Alto, CA (US)

(72) Inventor: Scott E. Solberg, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 387 days.

(21) Appl. No.: 14/010,076

(22) Filed: Aug. 26, 2013

(65) Prior Publication Data

US 2015/0056432 A1 Feb. 26, 2015

(51) Int. Cl.
*B29C 48/13* (2019.01)
*B29C 48/19* (2019.01)
(Continued)

(52) U.S. Cl.
CPC .............. *B29C 48/13* (2019.02); *B29C 48/07* (2019.02); *B29C 48/19* (2019.02); *B29C 48/20* (2019.02);
(Continued)

(58) Field of Classification Search
CPC ..... B29C 47/04; B29C 47/043; B29C 47/046; B29C 47/06; B29C 47/0033; B29C 47/062; B29C 47/064; B29C 47/065; B29C 47/0009; B29C 47/08; B29C 47/0811; B29C 47/0813; B29C 47/0816; B29C 47/0019; B29C 47/0021; B29C 47/92; B29C 2947/92514; B29C 2947/92609; B29C 2947/92628; B29C 47/00; B29C 47/0004; B29C 47/061; B29C 47/70; B29C 47/702; B29C 47/705; B29C 47/707; Y10T 428/25; Y10T 428/2976; Y10T 428/18; B32C 47/00; H01M 4/04; H01M 4/0402; H01M 4/0411; B05D 5/00; B05D 5/06; B05D 5/065; B05D 5/066; B05D 1/26; B05D 1/265; B32B 3/00; B32B 3/10; B32B 3/14; B32B 3/16; B32B 3/18; B32B 3/22
(Continued)

(56) References Cited

U.S. PATENT DOCUMENTS 3,195,865 A 7/1965 Harder
3,371,695 A * 3/1968 Lamb ........................... 220/675
(Continued)

FOREIGN PATENT DOCUMENTS

EP 0802034 10/1997
EP 1757429 2/2007
(Continued)

OTHER PUBLICATIONS

Espacenet machine translation (description only) of FR 1384293 A, translated May 8, 2015.*
(Continued)

*Primary Examiner* — Maria V Ewald
*Assistant Examiner* — Ethan A. Utt
(74) *Attorney, Agent, or Firm* — Miller Nash Graham & Dunn LLP

(57) ABSTRACT

A structure at least one stripe of material having a length, wherein a first stripe has a varying width along the length.

6 Claims, 4 Drawing Sheets

(51) Int. Cl.
  *B29C 48/20* (2019.01)
  *B29C 48/07* (2019.01)
(52) U.S. Cl.
  CPC .......... *Y10T 428/249921* (2015.04); *Y10T 428/2976* (2015.01)
(58) Field of Classification Search
  USPC .......... 428/221, 399, 54; 264/171.1, 171.11, 264/171.13, 171.21; 427/286; 429/209
  See application file for complete search history.

(56) References Cited

U.S. PATENT DOCUMENTS

| | | | |
|---|---|---|---|
| 3,382,534 A | | 5/1968 | Veazey |
| 3,443,278 A | * | 5/1969 | Nauta .................. B29C 47/043 264/173.18 |
| 3,556,833 A | | 1/1971 | Nirenberg |
| 3,583,678 A | | 6/1971 | Harder |
| 3,752,616 A | | 8/1973 | Matsui et al. |
| 3,860,036 A | | 1/1975 | Newman, Jr. |
| 3,949,970 A | | 4/1976 | ter Braak |
| 4,112,520 A | | 9/1978 | Gilmore |
| 4,222,671 A | | 9/1980 | Gilmore |
| 4,511,528 A | | 4/1985 | Kudert et al. |
| 5,094,793 A | | 3/1992 | Schrenk et al. |
| 5,143,681 A | | 9/1992 | Daubenbuchel et al. |
| 5,154,934 A | | 10/1992 | Okamoto |
| 5,362,360 A | * | 11/1994 | Bross .................. B29C 48/315 216/17 |
| 5,628,950 A | | 5/1997 | Schrenk et al. |
| 5,843,385 A | | 12/1998 | Dugan |
| 5,851,562 A | | 12/1998 | Haggard et al. |
| 5,882,694 A | | 3/1999 | Guillemette |
| 6,109,006 A | | 8/2000 | Hutchinson |
| 6,676,835 B2 | | 1/2004 | O'Connor et al. |
| 6,981,552 B2 | | 1/2006 | Reddy et al. |
| 7,090,479 B2 | | 8/2006 | Kegasawa et al. |
| 7,553,584 B2 | * | 6/2009 | Chiang .................. H01M 4/04 204/288 |
| 7,579,112 B2 | * | 8/2009 | Chiang .................. G02F 1/1523 429/209 |
| 7,690,908 B2 | | 4/2010 | Guillemette et al. |
| 7,700,019 B2 | | 4/2010 | Lavoie et al. |
| 7,765,949 B2 | | 8/2010 | Fork et al. |
| 7,780,812 B2 | | 8/2010 | Fork et al. |
| 7,799,371 B2 | | 9/2010 | Fork et al. |
| 7,883,670 B2 | | 2/2011 | Tonkovich et al. |
| 7,922,471 B2 | | 4/2011 | Fork et al. |
| 7,988,746 B2 | | 8/2011 | Chiang et al. |
| 8,080,729 B2 | * | 12/2011 | Fork .............. H01L 31/022425 136/252 |
| 8,148,009 B2 | | 4/2012 | Chiang et al. |
| 8,168,326 B2 | | 5/2012 | Chiang et al. |
| 8,206,025 B2 | | 6/2012 | Natarajan |
| 8,206,468 B2 | | 6/2012 | Chiang et al. |
| 8,206,469 B2 | | 6/2012 | Chiang et al. |
| 8,241,789 B2 | | 8/2012 | Chiang et al. |
| 8,277,975 B2 | | 10/2012 | Chiang et al. |
| 8,322,025 B2 | * | 12/2012 | Fork .............. H01L 31/022425 29/729 |
| 8,557,151 B2 | * | 10/2013 | Lipson .................. B29C 49/04 264/40.7 |
| 8,580,430 B2 | * | 11/2013 | Chiang .................. G02F 1/1523 429/209 |
| 8,586,129 B2 | * | 11/2013 | Fork .................... B05C 5/0212 136/256 |
| 8,586,238 B2 | | 11/2013 | Chiang et al. |
| 8,691,450 B1 | * | 4/2014 | Srinivasan .............. H01M 6/40 429/344 |
| 8,692,110 B2 | * | 4/2014 | Fork .............. H01L 31/022425 136/256 |
| 8,704,086 B2 | * | 4/2014 | Fork .............. H01L 21/6715 136/256 |
| 8,865,345 B1 | * | 10/2014 | Ramasubramanian .................. C25D 13/12 429/163 |
| 8,999,558 B2 | * | 4/2015 | Rust, III .............. H01M 4/0428 429/158 |
| 9,004,001 B2 | * | 4/2015 | Fork .................... B01F 5/0604 118/223 |
| 9,589,692 B2 | * | 3/2017 | Fork .................... B29C 48/255 |
| 9,590,232 B2 | * | 3/2017 | Cobb .................... H01M 4/366 |
| 9,761,901 B2 | * | 9/2017 | Rust, III .............. H01M 4/0428 |
| 9,793,537 B2 | * | 10/2017 | Cobb .................... B28B 11/243 |
| 9,899,669 B2 | * | 2/2018 | Cobb .................... B29C 48/18 |
| 10,014,517 B2 | * | 7/2018 | Spotnitz ............ H01M 10/0525 |
| 10,071,518 B2 | * | 9/2018 | Fork .................... B29C 48/185 |
| 10,232,537 B2 | * | 3/2019 | Fork .................... B01F 5/0604 |
| 10,256,500 B2 | * | 4/2019 | Rust, III .............. H01M 4/0428 |
| 2002/0074972 A1 | | 6/2002 | Narang et al. |
| 2002/0176538 A1 | | 11/2002 | Wimberger-Friedl et al. |
| 2002/0197535 A1 | | 12/2002 | Dudley et al. |
| 2003/0082446 A1 | * | 5/2003 | Chiang .................. H01M 4/04 429/209 |
| 2003/0111762 A1 | | 6/2003 | Floyd et al. |
| 2003/0189758 A1 | | 11/2003 | Baer et al. |
| 2006/0038310 A1 | * | 2/2006 | Lipson .................. 264/40.7 |
| 2007/0107773 A1 | * | 5/2007 | Fork .................. H01L 31/0684 136/256 |
| 2007/0108229 A1 | * | 5/2007 | Fork .................... B29C 48/305 222/129 |
| 2007/0110836 A1 | * | 5/2007 | Fork .................... B29C 48/30 425/133.5 |
| 2007/0279839 A1 | | 12/2007 | Miller |
| 2008/0099952 A1 | * | 5/2008 | Fork .................... B81C 99/0015 264/173.16 |
| 2008/0099953 A1 | * | 5/2008 | Fork .................... B29C 48/12 264/176.1 |
| 2008/0102558 A1 | * | 5/2008 | Fork et al. ................. 438/98 |
| 2009/0215917 A1 | * | 8/2009 | Trotter ............... C08G 18/0814 521/157 |
| 2009/0239332 A1 | * | 9/2009 | Fork .................... H01L 31/056 438/98 |
| 2010/0003603 A1 | | 1/2010 | Chiang et al. |
| 2010/0035152 A1 | * | 2/2010 | Sastry .................. H01M 4/70 427/58 |
| 2010/0117254 A1 | * | 5/2010 | Fork .................... B29C 48/92 264/129 |
| 2010/0118081 A1 | * | 5/2010 | Fork .................. H01L 21/6715 347/22 |
| 2010/0126574 A1 | * | 5/2010 | Fork .............. H01L 31/022425 136/256 |
| 2010/0221375 A1 | * | 9/2010 | Fork .................... B29C 48/21 425/113 |
| 2010/0221434 A1 | * | 9/2010 | Fork .................... B29C 48/92 427/348 |
| 2010/0221435 A1 | * | 9/2010 | Fork .................. H01L 21/6715 427/348 |
| 2010/0239700 A1 | | 9/2010 | Winroth |
| 2010/0252104 A1 | * | 10/2010 | Fork .................... B81C 1/00634 136/256 |
| 2010/0252105 A1 | * | 10/2010 | Fork .................... B29C 48/307 136/256 |
| 2010/0319761 A1 | * | 12/2010 | Fork .................. H01L 21/6715 136/252 |
| 2011/0005065 A1 | * | 1/2011 | Chiang .................. H01G 11/06 29/623.1 |
| 2011/0023961 A1 | * | 2/2011 | Fork .............. H01L 31/022425 136/256 |
| 2011/0045346 A1 | * | 2/2011 | Chiang .................. H01M 10/058 429/199 |
| 2011/0062622 A1 | * | 3/2011 | Fork .................... B81C 99/0015 264/211.12 |
| 2011/0064999 A1 | | 3/2011 | Chiang et al. |
| 2011/0070489 A1 | | 3/2011 | Chiang et al. |
| 2011/0110836 A1 | | 5/2011 | Rong et al. |
| 2011/0111283 A1 | * | 5/2011 | Rust, III .............. H01M 4/0428 429/163 |
| 2011/0151324 A1 | * | 6/2011 | Chiang .................. H01G 11/02 429/210 |

(56) References Cited

U.S. PATENT DOCUMENTS

| | | | |
|---|---|---|---|
| 2011/0189444 A1* | 8/2011 | Beers | B32B 3/10 428/192 |
| 2011/0278170 A1 | 11/2011 | Chiang et al. | |
| 2012/0052191 A1* | 3/2012 | Fork | H01L 31/18 427/75 |
| 2012/0153211 A1 | 6/2012 | Fork et al. | |
| 2012/0156364 A1* | 6/2012 | Fork | B29C 48/21 427/58 |
| 2012/0251896 A1* | 10/2012 | Chiang | H01M 10/052 429/338 |
| 2012/0282530 A1* | 11/2012 | Chiang | H01G 11/02 429/336 |
| 2012/0305578 A1* | 12/2012 | Lipson | B29C 48/92 220/675 |
| 2014/0170466 A1* | 6/2014 | Spotnitz | H01M 10/0525 429/149 |
| 2014/0186697 A1* | 7/2014 | Cobb | H01M 4/131 429/209 |
| 2014/0186698 A1* | 7/2014 | Cobb | B28B 11/243 429/209 |
| 2015/0174810 A1* | 6/2015 | Fork | B01F 5/0604 425/131.1 |
| 2015/0174811 A1* | 6/2015 | Fork | B01F 5/0604 427/256 |
| 2015/0270532 A1* | 9/2015 | Sastry | H01M 4/0426 427/446 |
| 2016/0013511 A1* | 1/2016 | Rust, III | H01M 4/0428 216/13 |
| 2017/0162858 A1* | 6/2017 | Cobb | H01M 4/0471 |
| 2018/0013166 A1* | 1/2018 | Rust, III | H01M 4/0402 |

FOREIGN PATENT DOCUMENTS

| | | |
|---|---|---|
| EP | 2056352 | 5/2009 |
| EP | 2466594 | 6/2012 |
| FR | 1308573 | 11/1962 |
| FR | 1384293 A * | 1/1965 |
| FR | 1384293 A | 1/1965 |
| JP | 59048137 A * | 3/1984 |
| JP | 9183147 | 7/1997 |
| JP | 2006326891 | 12/2006 |
| WO | 0121688 | 3/2001 |

OTHER PUBLICATIONS

Rosato, Dominick V. Rosato, Donald V.. (2003). Plastics Engineered Product Design—1.4 Fabricating Processes. Elsevier. Online version available at: app.knovel.com/hotlink/pdf/id:kt00TY2QO3/plastics-engineered-product/fabricating-processes.*

Translation of JP 59-048137 A, translated Apr. 17, 1995.*

Müller, Albrecht. (2003). Coloring of Plastics—Fundamentals, Colorants, Preparations—5. Colorants for Polymers. Hanser Publishers. Retrieved from app.knovel.com/hotlink/pdf/id:kt00B082P1/coloring-plastics-fundamentals/colorants-polymers (Year: 2003).*

European Search Report, dated Apr. 14, 2014, EP Application No. 13198599.6, 7 pages.

Fergus et al., "Recent Developments in Cathode Materials for Lithium Ion Batteries," Journal of Power Sources, Elsevier SA, Ch. vol. 195, No. 4, Feb. 15, 2010, pp. 939-954, XP026693512.

Espacenet machine translation (description only) of FR 1308573, translated Oct. 11, 2015.

* cited by examiner

CO-EXTRUSION OF PERIODICALLY MODULATED STRUCTURES

BACKGROUND

It is possible to extrude pastes and other viscous materials through an extrusion head to deposit the material onto a surface. The process may sometimes be referred to as micro-extrusion to differentiate it from extrusion processes using dies on large machines. The materials exiting the extrusion head are generally referred to as extrudates. The extrusion head typically has at least one input port to receive the material from some sort of reservoir, and at least one output port or die or nozzle to allow the extrudate to exit the head. A pump connected to the reservoir of material controls the flow, which in turn affects the resulting stripe of extrudate.

For most applications, it is desirable that the extrudate stripes have uniform shape and density. Extruded terminology generally refers to a single stripe of material as a one-dimensional structure. Structures having two or more stripes of material are referred to as two-dimensional. It is possible to form limited three-dimensional structures using extrusion heads in multiple passes, but the manufacturability issues and costs make that approach difficult. Hollow cavities, overhangs and other 'hidden' features require additional extrusion passes and/or additional processing steps. Generally, two dimensional extruded structures have multiple, linear, stripes of extrudates.

Being able to create features that are more than two-dimensional and not necessarily straight line features with an extrusion head would have advantages in surface area and material utilization for some applications. It is possible to vary the flow of material over time to generate extruded structures that are not linear, uniform stripes of extrudates.

DETAILED DESCRIPTION OF THE EMBODIMENTS

Figure 1:
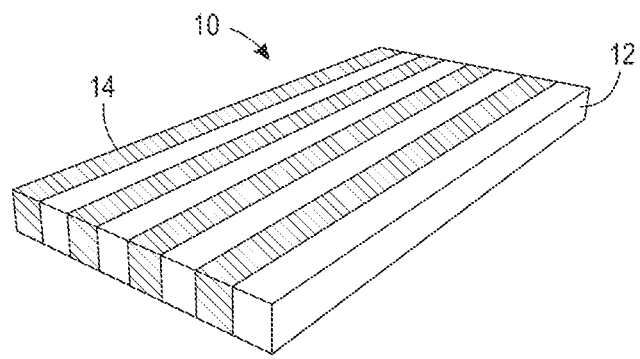
FIG. 1 shows a prior art two dimensional structure.
Figure 2:
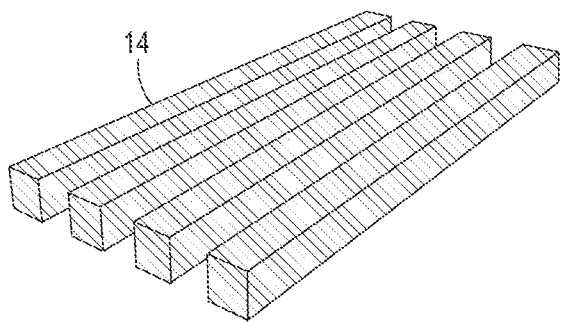
FIG. 2 shows a prior art two dimensional structure after removal of a sacrificial material.
Figure 3:
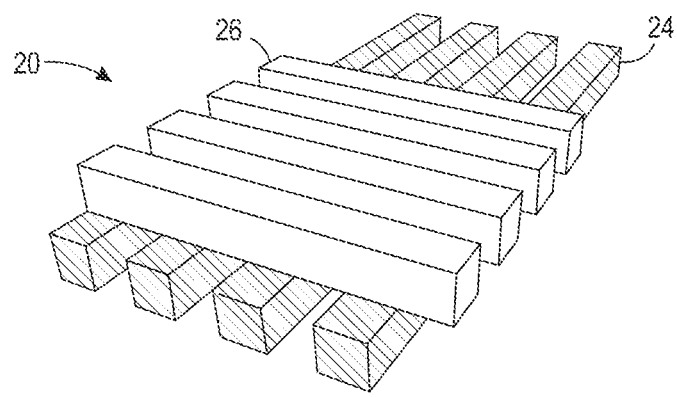
FIG. 3 shows a three dimensional structure formed in a method according to the prior art.

FIG. 1 shows a two-dimensional structure in accordance with the prior art. It is two-dimensional in that it has at least two stripes of materials. In extrusion, the simplest structures resulting from one circular or rectangular slot in an extrusion head is generally considered to be one-dimensional (1D). The next level of complexity would encompass 2D structures, resulting from extrusion heads that have multiple slots, such as 10 shown in FIG. 1. The same material 14 may be simultaneously extruded from different slots of the same or different forms, or multiple materials such as 12 and 14 could be co-extruded from multiple slots. In some structures, the second material 12 may be sacrificed to form gaps in the structure, where after removal the second material of the structure would then become air, as shown in FIG. 2.

A further level of complexity would be to achieve 3D structures such as 20, typically with multiple passes of the extrusion head to form layers of extruded materials such as 24 and 26. True 3D structures could include hidden features such as voids, overhangs, re-entrant features, etc., typically not achievable using a single pass of an extrusion head. However, it is possible to achieve 'near-3D' structures, having higher complexity than simple stripes or runs of multiple materials from a single pass extrusion head.

Figure 4:
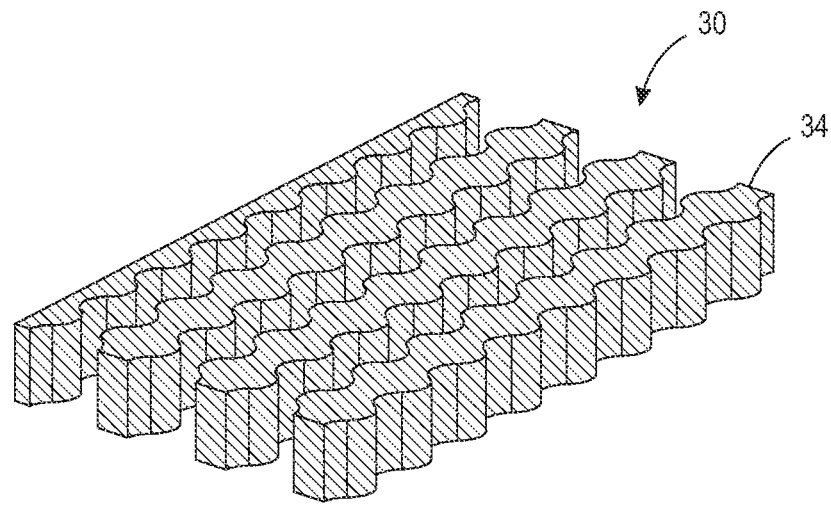
FIG. 4 shows an embodiment of a near-three dimensional structure of material having varying widths.

The embodiments here may be referred to as 'near-3D' or 2.5D structures. The features of the resulting stripes of materials are more complex than simple stripes of materials, having varying widths along their lengths. This may be accomplished by varying the pressure used to extrude the materials over time. FIG. 4 shows an embodiment or a representation of such a 'near-3D' structure 30. The extrudate stripes 34 have varying width along their length, referred to here as periodically modulated stripes. The stripes may be extruded from a single material 34 from an extrusion head. The varying width may have a periodic pattern as shown, but the varying width may also have a non-periodic, or randomized, pattern. However, the use of a periodic pattern of the first extrudate allows for some variations.

Figure 5:
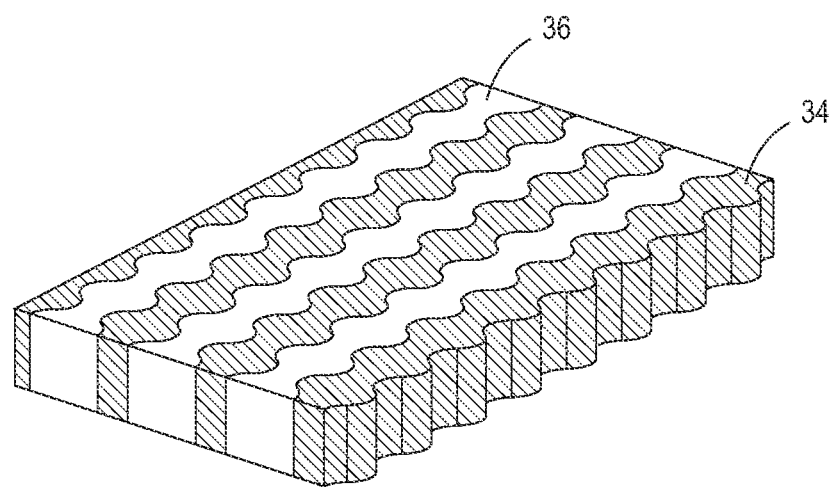
FIG. 5 shows an embodiment of a near-three dimensional structure of two materials having complementary patterns of varying widths.

FIG. 5 shows a near-3D structure having extrudate stripes of periodically varying widths. The first extrudate 34 has a first pattern of varying widths. The second extrudate 36 has a complementary second pattern where the wide portions and narrow portions of the second pattern match up to the narrow portions and wide portions of the first pattern. The two patterns are accomplished by periodically modulating the pump differently over time for each pattern. The modulation of the flow of materials over time allows the formation of the patterns.

The two materials may consist of any material that can be extruded through the extrusion head. Typically, the materials are pastes. The materials remain separate from each other. The materials may be a mixture of other materials, but for the purposes of this discussion, when they exit the print head as extrudates they are each one material. Similarly, the two extrudates remain separate from each other, even though they may be extruded together. Some mixing may occur at the material boundaries, but the integrity of each is substantially maintained. One should note that the examples here discuss two materials, but more than two materials may be used.

Figure 6:
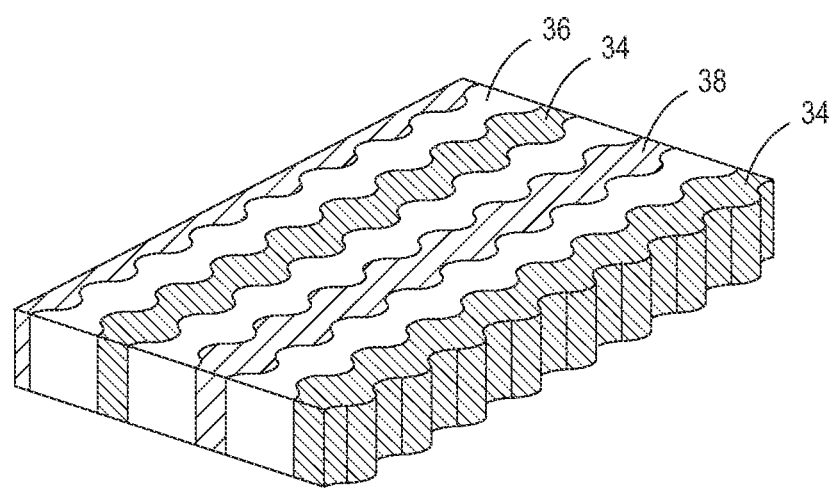
FIG. 6 shows an embodiment of a near-three dimensional structure of three materials.

FIG. 6 shows an example of a near-three dimensional structure having more than two materials. The extrudates 34 and 36 have another extrudate 38 in the structure. The materials are modulated with respect to time as before, but the extrudates 34 and 38 would be modulated in phase with each other to form the patterns that complement the pattern of extrudate 36. For example, the extrudates may form the pattern of extrudate 34, extrudate 36, extrudate 38, extrudate 36, extrudate 34, etc.

The pastes may contain materials which would form electrically conductive or electrochemically active structures, as examples. Electrochemically active materials may be used in electrode structures that make up part of batteries. Non-active materials may be used as filler and then sacrificed. If non-active, or sacrificial, material is used, then once the non-active material is removed, such as be drying, sintering, etc., it can be replaced with another material; but in the instance where no other material is subsequently introduced, then gaps would remain, where the second material would be air.

If for example one of the materials is electrochemically active, a simple model assuming sinusoidal modulation has shown that the resulting structure has approximately 21% greater periphery while having about 10% less average distance between the centerline of an extruded stripe and the nearest border, compared to a conventional linear extruded structure. This increase in surface area, and decrease in the average distance between the interior and border, could for example enhance functional material reaction rates or utilization. Even such a small improvement could be economically significant in a cost-sensitive business such as battery manufacturing.

To vary the widths along the length of the features, the dispensing system uses a pump to create a pressure that then forces the paste out of the extrusion head. One embodiment uses a spool valve to modulate the flow from the pump. Spool valves typically consist of a cylinder housed in a case. The case contains a system of valves that connect to a reservoir and pump on one side. The spools in the valve slide or rotate in the system in response to fluid flow levels to either open or block channels. The fluid from the reservoir flows through the open channels. Typically, spool valves have a controller device that actuates the valve to rotate the spools into the necessary position. FIG. 6 shows an example of this type of system.

Figure 7:
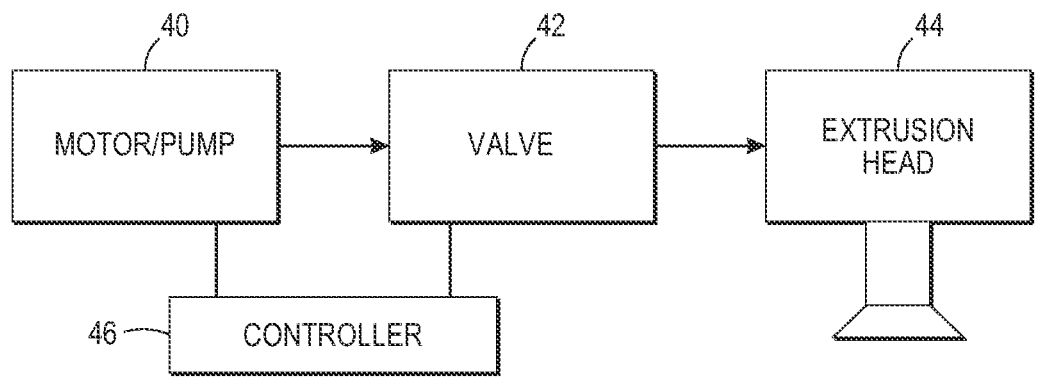
FIG. 7 shows an embodiment of a system for modulating pressures in an extrusion head.

In FIG. 7, the motor/pump 40 would connect to the reservoir of material or reservoirs of materials. The controller 46 may control the pump/motor and/or the valve 42. The fluid then flows out of the extrusion head 44 in response to the pressure. In one embodiment, a pressure modulation cycle of 18 milliseconds (msec) is used.

Figure 8:
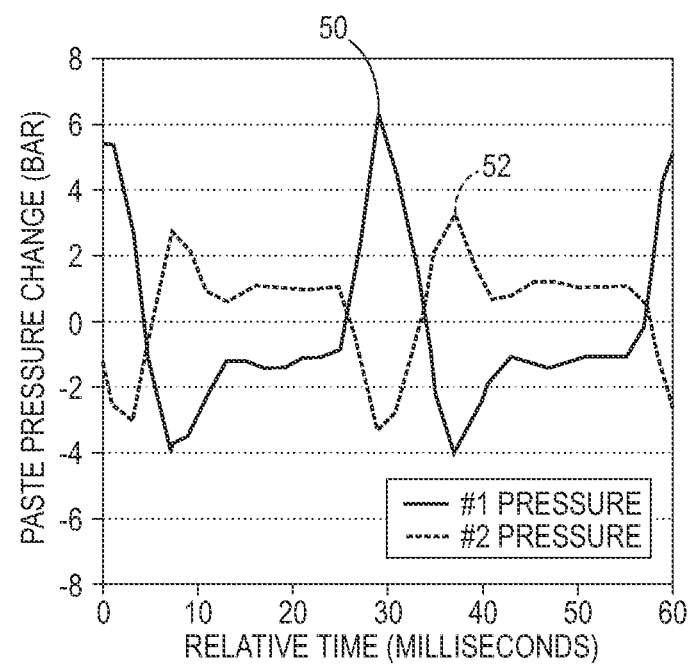
FIG. 8 shows a graph of paste pressures in an extrusion head.

FIG. 8 shows graphical representations of downstream paste pressure responses for rapid partial strokes. Paste #1 is a functional paste in this embodiment, and #2 is a sacrificial paste. Curve 50 is the pressure of paste #1, and curve 52 is for paste #2.

Another embodiment may employ a rotary motor to drive a cam, which in turn would drive a piston. Another piston embodiment may use a linear, moving-coil actuator that would require a mechanical linkage to produce enough force to push on the high pressure paste.

Other variations and modifications exist. The embodiments up to this point have assumed that the materials reside adjacent to each other laterally. It is also possible that the materials can be stacked vertically. Further, the vertical thickness of the materials may be of any thickness. Typically, the thickness may be approximately 10 microns or greater.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A structure, comprising:
   a first longitudinal stripe of a first material containing at least one electrochemically active material on a surface, the first stripe having borders with a first continuous, periodic sinusoidal pattern of wider and narrower portions about a centerline of the first stripe, wherein the centerline is between the borders; and
   a second longitudinal stripe of a second material adjacent to, and in contact with, the first stripe, the second stripe having borders with a second continuous, periodic sinusoidal pattern of wider and narrower portions about a centerline of the second stripe complementary to the first pattern, wherein the centerline is between the borders.

2. The structure of claim 1, wherein the first material and the second material are a same material.

3. The structure of claim 1, wherein the first material and the second material are different materials.

4. The structure of clam 1, further comprising a third material.

5. The structure of claim 1, wherein the second material is a non-active material.

6. The structure of claim 1, wherein the first material is electrically conductive.

* * * * *